United States Patent [19]

Uchida et al.

[11] 4,220,729

[45] Sep. 2, 1980

[54] FLAME-RETARDANT ISOCYANATE-BASED FOAMS AND METHOD OF PRODUCING THE SAME

[75] Inventors: Shinzi Uchida, Yokohama; Takashi Yokoyama, Tokyo; Shoichi Ohkubo, Yokohama, all of Japan

[73] Assignee: Mitsubishi Chemical Industries Limited, Tokyo, Japan

[21] Appl. No.: 815,681

[22] Filed: Jul. 14, 1977

[51] Int. Cl.$^2$ .................... C08G 18/14; C08G 18/22; C08G 18/58

[52] U.S. Cl. .................................. 521/124; 521/156; 521/157; 521/902; 521/906

[58] Field of Search ................ 521/124, 156, 157, 906

[56] References Cited

U.S. PATENT DOCUMENTS

| | | | |
|---|---|---|---|
| 3,450,648 | 6/1969 | Windemuth et al. | 521/124 |
| 4,022,721 | 5/1977 | Ashida | 521/124 |

*Primary Examiner*—H. S. Cockeram

*Attorney, Agent, or Firm*—Oblon, Fisher, Spivak, McClelland & Maier

[57] ABSTRACT

A method of producing foams by utilizing the reactivity of isocyanate groups comprising the steps of reacting an organic polyisocyanate in the presence of a foaming agent and, optionally, at least one member selected from the group consisting of polyols, polyepoxides, polycarboxylic acids, acid anhydrides and other compounds capable of reacting with the isocyanate groups and, if necessary, a catalyst, a foam stabilizer and other additives, the improvement wherein at least one organic amine-metal complex soluble in the liquid raw material and containing a metal selected from the group consisting of copper, nickel, lead, cobalt, manganese, zinc, and chromium is added to the reaction system in an amount of 0.5 to 30 weight % based on the total weight of the raw materials used for the preparation of foams. The foams containing flame-retardant organic amine-metal complexes prepared by the aforementioned method.

50 Claims, No Drawings

FLAME-RETARDANT ISOCYANATE-BASED FOAMS AND METHOD OF PRODUCING THE SAME

BACKGROUND OF THE INVENTION

1. Field of the Invention

This invention relates to the flame-retardant isocyanate-based foams and a method of producing such foams, and more particularly it relates to the flame-retardant foams obtained by utilizing the reactivity of the isocyanate groups and a method of producing such foams.

2. Description of the Prior Art

There are known various kinds of foams obtained by utilizing the reactivity of the isocyanate groups, and among such foams are, for example, polyurethane foams which are obtained by the reaction of a polyisocyanate and a polyol thereby forming polyurethane bonds, urethane-modified polyisocyanurate foams obtained by the formation of urethane bonds and isocyanurate rings formed by a trimerization reaction of isocyanate groups, unmodified polyisocyanurate foams obtained merely by a trimerization reaction of isocyanate groups, and other varieties of foams which are obtained by introducing the imide bonds, amide bonds, carbodiimide bonds, urea bonds or oxazolidone bonds into the above-said types of foams during or before the foam forming reaction.

Usually, these foams are produced by reacting an isocyanate in the presence of a foaming agent and, optionally, one or more kinds of the compounds capable of reacting with the isocyanate groups, such as polyols, polyepoxides, polycarboxylic acids and acid anhydrides, and if necessary, further adding a catalyst, surfactant, flame retardant and other additives.

Any of these foams can be provided with flame retardancy to a certain extent depending on the materials used. Particularly the isocyanurate foams obtained from a trimerization reaction of isocyanate groups have fairly high flame retardancy.

As flame retardants for polyurethane foams, there are known phosphorus-based flame retardants (DT-OS No. 2,208,719, etc.) halogen- or halogen-phosphorus-based flame retardants (U.S. Pat. No. 3,262,894, U.S. Pat. No. 3,549,564, etc.) and complexes of transition metals and ammonia (U.S. Pat. No. 3,611,809). However, any of these flame retardants involve some serious problems, such as unsatisfactory flame retarding effect or possibility of inducing corrosion of the base metal of a heat insulator or producing toxic gas in combustion particularly when the foam added with a halogen-based flame retardant is used.

The present inventors have carried on the study aimed at further improvement of flame retardancy of various kinds of foams obtained by the utilization of reactivity of the isocyanate groups and found out that addition to these foams of an organic amine-metal complex of the type soluble in the liquid material for foam preparation results in reduced surface flammability and marked improvement in flame resistance of the obtained foams.

SUMMARY OF THE INVENTION

Thus, the object of the present invention is to provide flame-retardant isocyanate-based foams with reduced surface flammability and improved flame resistance. According to this invention, the above-said object can be accomplished by adding an organic amine-metal complex of the type soluble in the liquid raw material for foam preparation and containing a metal selected from the group consisting of copper, nickel, lead, cobalt, manganese, zinc and chromium, in the production of foams obtained by the utilization of the reactivity of the isocyanate groups by reacting an organic polyisocyanate in the presence of a foaming agent and, optionally, one or more of polyols, polyepoxides, polycarboxylic acids, acid anhydrides and other compounds capable of reacting with the isocyanate groups, and if necessary a catalyst, a foam stabilizer and other additives.

DESCRIPTION OF THE PREFERRED EMBODIMENTS

The organic amine-metal complex used in this invention must be soluble in the liquid raw material used for preparing foams. If the complex is in the form of powder, it is recommended to dissolve such powdery complex in the liquid starting materials other than polyisocyanate such as polyol, catalyst, surfactant or, in some cases, other flame retardant. In case the powdery complex won't dissolve in such single component, it is suggested to dissolve it in a mixture of the above components. In case the said complex is liquid, it can be added directly to the reaction mixture. The only requirement is that, after foaming, the substantial portion of the organic amine-metal complex added be dispersed uniformly at the molecular level in the foam or reacted uniformly with the isocyanate.

In the case of foams obtained by using a polyol, an organic amine-metal complex can be synthesized in the polyol, and if such complex stays dissolved in the polyol, the mixture may be immediately used as raw material for foam preparation.

The organic amine compounds and metals used for forming the organic amine-metal complexes employed in this invention, will now be discussed.

The organic amines used for the complexes of this invention are not limited to any specific compound but may be of any type which is capable of forming, together with a metal compound, a complex which is soluble in the raw material liquid for preparing foams. Preferred examples of such amines are alkylmonoamines such as methylamine, ethylamine, n-propylamine, isopropylamine, n-butylamine, isobutylamine, t-butylamine and hexylamine, alkylenediamines such as ethylenediamine, N-methyl-ethylenediamine, N,N-dimethylethylenediamine, N,N,N',N'-tetramethylethylenediamine, 1,3-propanediamine, 1,2-propanediamine, 1,4-butanediamine, 1,5-pentanediamine and 1,6-hexanediamine, alkylenepolyamines such as diethylenetriamine and triethylenetetramine, alkanolamines such as monethanolamine, diethanolamine, triethanolamine, 1-aminopropane-2-ol, N-hydroxyethylethylenediamine and N-hydroxypropylethylenediamine, and aromatic monoamines such as aniline, o-, m- and p-methylaniline and aminophenol.

The metals capable of forming a complex with the organic amine and contributing to improve the flame retardancy of the foam are copper, nickel, lead, cobalt, manganese, zinc and chromium, and among those, preferred are copper, nickel, lead and cobalt, and the most preferred is copper.

The organic amine-metal complexes usable in this invention may be prepared by any known method of synthesis. For instance, in case of synthesizing ethylenediamine copper acetate, copper acetate is dispersed in methanol and this mixture is added with ethylenediamine and agitated, whereby copper acetate is gradually dissolved and a dark blue solution is obtained. The mode of coordination of ethylenediamine in the complex can be easily assumed from a measurement of the visible or ultraviolet portion of the spectrum. In the case of ethylenediamine copper acetate, there is obtained a spectrum having a peak at absorption wavelength of 570 nm. In the case of triethylenetetramine copper acetate, there is obtained a dark blue solution composed of copper acetate and triethylenetetramine. This solution gives a spectrum having a peak at absorption wavelength of 615 nm.

The organic amine-metal complexes usable in this invention are the complexes of organic amines and salts of the above-said types of metals, usually organic acid salts such as acetates, octanoates and benzoates. The following are typical examples of such complexes. Those obtained from alkylmonoamines and metal salts: methylamine copper acetate, ethylamine copper acetate, n-propylamine copper acetate, n-propylamine copper benzoate, n-propylamine nickel acetate, n-butylamine copper acetate, isobutylamine copper acetate and hexylamine copper acetate. Those obtained from alkylenediamines and metal salts: ethylenediamine copper acetate, ethylenediamine copper octanoate, ethylenediamine copper benzoate, ethylenediamine chromium acetate, ethylenediamine cobalt acetae, ethylenediamine nickel acetate, ethylenediamine lead acetate, tetramethylethylenediamine copper acetate, N,N-dimethylethylenediamine copper acetate, 1,3-propanediamine copper acetate, 1,2-propanediamine copper acetate and 1,6-hexanediamine copper acetate. Those obtained from alkylenepolyamines and metal salts: diethylenetriamine copper acetate, diethylenetriamine manganese acetate, diethylenetriamine cobalt acetate, triethylenetetramine copper acetate and triethylenetetramine zinc acetate. Those obtained from alkanolamines and metal salts: monoethanolamine copper acetate, monoethanolamine cobalt benzoate, diethanolamine copper acetate, 1-aminopropane-2-ol copper acetate and N-hydroxyethylethylenediamine lead acetate. Those obtained from aromatic amines and metal salts: aniline copper acetate, methylaniline copper acetate and aminophenol copper acetate.

The amount of the organic amine-metal complex to be added is not critical but it should be take into account that too high an amount of the complex may cause too high foaming rate or embrittlement of the produced foam, while less amount thereof results in unsatisfactory flame-retarding effect. Therefore, the practical effective range of the amount of the organic amine-metal complex is from 0.5 to 30% by weight, preferably 1 to 10% by weight, most preferably 2 to 8% by weight, based on the amount of the liquid raw material used for preparation of foam. Specifically the liquid raw material includes the total amount of isocyanate and metal complex or the total amount of isocyanate, the substance reactive therewith, such as polyol, and the metal complex.

As mentioned above, it is essential that the organic amine-metal complex is soluble in the liquid raw material, and it is desirable that at least 0.5%, preferably all of the complex added be dissolved in the said liquid.

Addition of an organic amine-metal complex insoluble in the liquid raw material, such as for example ethylenediamine copper dichloride, ethylenediamine copper sulfate, ethylenediamine iron chloride or ethylenediamine iron acetate, provides little improvement in flame retardancy of the product.

The isocyanates used in this invention are, for example, aromatic polyisocyanates such as diphenylmethane diisocyanate (MDI), polyphenylene polymethylene polyisocyanate mixture (crude MDI), 2,4-tolylene diisocyanate (2,4-TDI), 2,6-tolyelen diisocyanate (2,6-TDI) and xylylene diisocyanate (XDI), aliphatic polyisocyanates such as hexamethylene diisocyanate, and alicyclic polyisocyanates such as isophorone diisocyanate. These organic polyisocyanates may be used either singly or in a mixed form.

As for the polyols used for the preparation of polyurethane foams, urethane-modified polyisocyanurate foams and urethane-modified polycarbodiimide foams, it is possible to use the polyols of any hydroxyl value if they are of the type commonly employed for production of polyurethanes, but as the organic amine-metal complex used in this invention has a particularly high effect in improving flame retardancy of the rigid foams, it is most preferred to use the polyols of the type which is generally employed for production of rigid polyurethane foams such as polyetherpolyols, polyesterpolyols or mixture thereof whose hydroxyl value are within the range of 100 to 800. Typical examples of polyetherpolyols are polyetherglycols such as polypropylene ether glycol, polyethylenepolypropylene ether glycol, polytetramethylene ether glycol, polypentamethylene ether glycol, polyhexamethylene ether glycol, polyoctamethylene ether glycol, glycols having an aromatic ring obtained by adding propylene oxide or ethylene oxide to bisphenol A, and branched polyetherpolyols obtained by reacting glycol, alkylene oxide or a substituted derivative thereof or a mixture thereof with a material such as sucrose, sorbitol, styrene-vinyl alcohol copolymers, hexanetriol, pentaerythritol, glycerin, trimethylolphenol, trimethylolpropane, 1,4-butanediol, ethylenediamine or analogous compounds thereof in the presence of a suitable catalyst.

The preferred examples of polyesterpolyols used in this invention are those prepared from dibasic carboxylic acids and polyhydroxyl compounds. The dibasic carboxylic acids usable for this purpose are those having no functional group with active hydrogen other than carboxyl group, and preferred examples of such carboxylic acids are phthalic acid, terephthalic acid, isophthalic acid, succinic acid, glutaric acid, adipic acid and pimelic acid. Anhydrides of these acids are also usable.

The compounds having the carboxyl groups, which can be used for production of amide-modified or amide-urethane-modified polyisocyanurate foams in this invention, are for example the above-mentioned carboxylic acid or the carboxy-terminated polyesters obtained from the above-said dibasic acids and polyhydroxyl compounds.

For producing the amide-modified foams, there can be used either the prepolymer process or the one-shot process. According to the former process, a dibasic carboxylic acid such as above-mentioned is previously reacted with an isocyanate to synthesize an isocyanate-terminated amide prepolymer, which serves as an isocyanate component starting material, and this is reacted in the presence of an organic amine-metal complex, a trimerization catalyst, a foaming agent, a surfactant and, optionally, a polyol to thereby form a foam. In the one-shot process, a dibasic carboxylic acid is directly added to the raw material liquid. In the latter process, in case the dibasic carboxylic acid is solid, it is desirable to use it in the form dissolved in the polyol or the like.

In the production of the imide-modified or imide-urethane-modified polyisocyanurate foams, there is included a reaction of an isocyanate and an acid anhydride. Typical examples of the acid anhydrides usable for this reaction are trimellitic acid anhydride, pyromellitic acid anhydride and benzophenonetetracarboxylic acid anhydride.

For producing imide-modified foams by using such acid anhydride, the latter is previously reacted with an isocyanate to synthesize an isocyanate-termenated prepolymer containing imide bonds, and this is reacted in the same way as in the above-said case of production of amide-modified or amide-urethane-modified polyisocyanurate foams.

In the case of the foams where a polyol is used, the highest flame retardancy improving effect is provided when the equivalent ratio of NCO/OH (equivalent ratio of isocyanate groups to hydroxyl groups in polyol) is within the range of 1 to 3, and such effect is higher than that of the conventional halogen-phosphorus flame retardants. In the foams where the NCO/OH ratio is over 3, that is, in the above-said urethane-modified polyisocyanurate foams, the flame retarding effect is not so conspicuous as in the case of polyurethane foams, but deterioration of heat resistance and particularly lowering of dimensional stability under high temperatures, which is often caused when the conventional halogen-phosphorus flame retardants are added, are not found.

As a flame retardants for the forms prepared by using polyol, an inorganic cobalt ammine complex [Co(NH$_3$)$_5$Cl]Cl$_2$ is reported in Journal of Cellular Plastics, July/August (1971), page 203, but this complex does not dissolve in the liquid raw material for foam preparation and is also less effective in flame retarding effect than the organic amine-metal complexes.

As for the catalysts used in producing the foams according to the method of this invention, it is not essential to use an ordinary type of urethane-forming catalyst in the case of polyurethane foams because the organic amine-metal complex serves as an urethane-forming catalyst, but usually use of an urethane-forming catalyst proves helpful in advancing the reaction more smoothly. Examples of the urethane-forming catalyts usable in this invention are organic tin compounds, phosphines and tertiary amines.

Among the tertiary amines usable for the said purpose are, for example, triethylamine, triethylenediamine, N,N,N',N'-tetramethylethylenediamine, N,N,N',N'-tetraethylethylenediamine, N-methyl-morpholine, 1,1,3-3-tetramethylguanidine, N,N,N',N'-tetramethyl-1,3-butanediamine, N,N-dimethylethanolamine, and N,N-diethylethanolamine.

As regards the catalysts used in producing various kinds of modified polyisocyanurate foams or unmodified polyisocyanurate foams including a trimerization reaction of the isocyanate groups, it is possible to use any known type of trimerization catalysts including, for example, alkali alcoholate such as polypropylene glycol sodium salts derived from polypropylene glycol, alkali metal salts such as potassium benzoate, sodium acetate, potassium oleate and potassium salts of polymerized linseed oil fatty acids, and tertiary amines such as N,N',N''-tris(dialkylaminoalkyl)-symhexahydrotriazine, 2,4,6-tris(dimethylaminoalkyl)phenol and triethylenediamine, and these catalysts may be used either singly or in admixture. Use of an epoxy compound in combination with any of the above catalysts can produce even a higher effect. Examples of the epoxy compounds include saturated monoxides such as epichlorohydrin, allylglycidyl ether, phenylglycidyl ether, glycidyl methacrylate, styrene oxide, propylene oxide and butadiene monoxide, and glycidyl ethers such as diglycidyl ether and bisphenol A diglycidyl ether.

In the present invention, it is possible to add a surfactant which can promote homogenization of the reaction mixture during production of the foam and is capable of adjusting the cellular structure of the produced foam. Preferred examples of such surfactants are silicon-containing compounds such as polysiloxane-polyoxyalkylene copolymers and other organo polysiloxanes. Also usable as such surfactants are polyoxyethylene-alkylphenol adducts, polyethyleneoxide-aliphatic alcohol adducts, and block copolymers of ethylene oxide and propylene oxide.

The foaming agent used in the method of this invention may be a gaseous material such as carbon dioxide which is generated by adding water to the reaction mixture during production of the foam or externally applied carbon dioxide, nitrogen or a mixture thereof. Another preferred example of such foaming agent is the low-boiling liquid which is evaporated by the reaction heat generated during production of the foam. The fluorinated and/or chlorinated hydrocarbons with boiling point of from $-50°$ C. to $+110°$ C. are the foaming agents with good compatibility, and the typical examples of such foaming agents are trichloromonofluoromethane, dichlorodifluoromethane, dichloromonofluoromethane, monochlorodifluoromethane, dichlorotetrafluoroethane, 1,1,2-trichloro-1,2,2-trifluoroethane, dibromofluoromethane and monobromotrifluoroethane. Among other substances usable as foaming agent in this invention are benzene, toluene, methylene chloride and hexane. These foaming agents may be used either singly or in combination.

In the present invention, another flame retardant may be used in some cases. Such flame retardant is preferably of the type which is generally used for polyurethane foams, urethane-modified polyisocyanurate foams and other like foams. Typical examples of such flame retardant are halogenated organic phosphorus compounds such as tris(chloroethyl)phosphate, tris(dichloropropyl)phosphate and tris(dibromopropyl)phosphate, and inorganic flame retardants such as antimony oxide.

We will now describe the examples of preparation of the raw materials as well as embodiments of this invention, but this invention is not subject to restriction by these examples but may be embodied in other forms without departing from the spirit or scope of the invention.

PREPARATION OF ORGANIC AMINE-METAL COMPLEXES

PREPARATION EXAMPLE 1

0.5 mole (90.7 gr) of copper acetate was added to and dispersed in 700 ml of methanol, and after further adding 1 mole (60 gr) of anhydrous ethylenediamine, the mixture was agitated for a while, consequently obtaining a deep blue homogenous solution. This solution was filtered and the filtrate was concentrated. The obtained crystals were dissolved in water and a visible spectrum thereof was taken. It showed an absorption band having a peak at wavelength 570 nm, assuring that the obtained product is ethylenediamine copper acetate.

PREPARATION EXAMPLES 2 TO 24

A metal salt was added to 200 ml of methanol, followed by agitation, and after further adding an organic amine, the mixture was again agitated. When undissolved portion was not recognized, the produced solution was filtered and the filtrate was concentrated by a thin film evaporator to obtain an organic amine-metal complex. The kind and amounts of the metal salts and organic amines used as well as the method of confirmation of formation of each complex are shown in Table 1 below.

Table 1

| Synthesis No. | Organic amine | Moles(g) | Metal salt | moles(g) | Organic amine-metal complex | Confirmation of formation of metal complex |
|---|---|---|---|---|---|---|
| 2 | Ethylene-diamine | 0.2 (12) | Copper acetate [$Cu(CH_3COO)_2 \cdot H_2O$] | 0.1 (20) | Ethylenediamine copper acetate | When the metal salt was added to methanol, it was partly dissolved to present light blue. When this mixture was further added with the amine and agitated, the metal salt was perfectly dissolved and a deep-blue solution was formed. |
| 3 | Ethylene-diamine | " | Basic copper acetate [$Cu(CH_3COO)_2$ $CuO \cdot 6H_2O$] | 0.05 (18.5) | Ethylenediamine copper acetate | When the metal salt was added to methanol, it was partly dissolved to present light blue. When this mixture was further added with the amine and agitated, the metal salt was perfectly dissolved and a deep-blue solution was formed. |
| 4 | Ethylene-diamine | " | Copper benzoate [$Cu(C_6H_5COO)_2$] | 0.1 (10) | Ethylenediamine copper benzoate | When the metal salt was added to methanol, it was partly dissolved to present light blue. When this mixture was further added with the amine and agitated, the metal salt was perfectly dissolved and a deep-blue solution was formed. |
| 5 | Ethylene-diamine | " | Chromium acetate [$Cr(CH_3COO)_2 \cdot H_2O$] | 0.1 (24.7) | Ethylenediamine chromium acetate | When the metal salt was added to methanol, the former was dissolved to present a bluish green color. When this mixture was further added with the amine and agitated, the color changed to dark red. |
| 6 | Ethylene-diamine | " | Cobalt acetate [$Co(CH_3COO)_2 \cdot 4H_2O$] | 0.1 (24.9) | Ethylenediamine cobalt acetate | When the metal salt was added to methanol, it was partly dissolved to present light pink, and when this solution was further added with the amine and agitated, the precipitate of the metal salt disappeared and a dark brown solution was formed. |
| 7 | Ethylene-diamine | " | Nickel acetate [$Ni(CH_3COO)_2 \cdot 4H_2O$] | 0.1 (24.9) | Ethylenediamine nickel acetate | When the metal salt was added to methanol, it was partly dissolved to present bluish green, and when this mixture was further added with the amine and agitated, the precipitate of the metal salt disappeared and a dark blue solution was formed. |
| 8 | Ethylene-diamine | " | Lead acetate [$Pb(CH_3COO)_2 \cdot 3H_2O$] | 0.1 (37.9) | Ethylenediamine lead acetate | Although no difference was seen between the metal salt and the metal complex in their solubility in ethanol and hue, the metal salt was colorless transparent crystals whereas the metal complex was wax. |
| 9 | Methylamine (40% aqueous | 0.4 (30.7) | Basic copper acetate | 0.05 (18.5) | Methylamine copper acetate | Same as Synthesis No. 2. |

Table 1-continued

Syntheses of organic amine-metal complexes

| Synthesis No. | Organic amine | Moles(g) | Metal salt | moles(g) | Organic amine-metal complex | Confirmation of formation of metal complex |
|---|---|---|---|---|---|---|
| | solution) | | [Cu(CH$_3$COO)$_2$ · CuO · 6H$_2$O] | | | |
| 10 | Propylamine | 0.4 (22.8) | Basic copper acetate [Cu(CH$_3$COO)$_2$ · CuO · 6H$_2$O] | 0.05 (18.5) | Propylamine copper acetate | Same as Synthesis No. 2. |
| 11 | " | 0.4 (22.8) | Nickel acetate | 0.1 (23.7) | Propylamine nickel acetate | The metal salt, when added to methanol, was dissolved therein to present bluish green, and when this mixture was further added with the amine, the color changed to blue. |
| 12 | Diethylene-triamine | 0.1 (10.3) | Basic copper acetate | 0.05 (18.5) | Diethylenetri-amine copper acetate | Same as Synthesis No. 2. |
| 13 | Diethylene-triamine | 0.1 (10.3) | Manganese acetate [Mn(CH$_3$COO)$_2$ · 4H$_2$O] | 0.1 (24.5) | Diethylenetri-amine manga-nese acetate | When the metal salt was added to methanol, it was partly dissolved to present faint yellow. When this mixture was further added with the amine and agitated, the precipitate of the metal salt disappeared and a brown solution was formed. |
| 14 | Diethylene-triamine | 0.1 (10.3) | Nickel chloride [NiCl$_2$ · 6H$_2$O] | 0.1 (23.7) | Diethylene-triamine nickel chloride | When the metal salt was added to methanol, it was dissolved to present light yellow, and when the amine was added thereto, the color changed to blue. |
| 15 | Triethylene-tetramine | 0.1 (14.6) | Basic copper acetate | 0.05 (18.5) | Triethylene-tetramine copper acetate | Same as Synthesis No. 2. |
| 16 | Triethylene-tetramine | 0.1 (14.6) | Zinc acetate [Zn(CH$_3$COO)$_2$ · 2H$_2$O] | 0.1 (22) | Triethylene-tetramine zinc acetate | When the metal salt was added to methanol, it was scarcely dissolved, and when the amine was added thereto, the metal salt precipitate disappeared. The obtained complex was waxy. |
| 17 | Aniline | 0.4 (37.2) | Basic copper acetate | 0.05 (18.5) | Aniline copper acetate | When the metal salt was added to methanol, it was partly dissolved to present light blue, and when this mixture was further added with aniline and agitated, the metal salt precipitate disappeared and a greenish black solution was formed. |
| 18 | Hexamethylene-diamine | 0.2 (23.2) | Lead acetate [Pb(CH$_3$COO)$_2$ · 3H$_2$O] | 0.1 (37.9) | Hexamethylene-diamine lead acetate | Although there was seen almost no change in solubility of the metal salt and the metal complex in methanol and in hue, the metal salt was in the form of crystals whereas the metal complex was waxy. |
| 19 | Monoethanol-amine | 0.4 (24.4) | Basic copper acetate | 0.05 (18.5) | Monoethanol-amine copper acetate | Same as Synthesis No. 2. |
| 20 | Monoethanol-amine | 0.4 (24.4) | Cobalt benzoate [Co(C$_6$H$_5$COO)$_2$] | 0.1 (35.5) | Monoethanol-amine cobalt benzoa-te | When the metal salt was added to methanol, it was partly dissolved to present pink, and when this solution was further added with the amine and agitated, the metal salt precipitate disappeared and a dark pinkish brown solution |

Table 1-continued

Syntheses of organic amine-metal complexes

| Synthesis No. | Organic amine | Moles(g) | Metal salt | moles(g) | Organic amine-metal complex | Confirmation of formation of metal complex |
|---|---|---|---|---|---|---|
| | | | | | | was formed. |
| 21 | Tetramethyl-ethylene-diamine | 0.2 (23.2) | Basic copper acetate | 0.05 (18.5) | Tetramethyl-ethylendiamine copper acetate | Same as Synthesis No. 2. |
| 22 | Mixed amine | | Basic copper acetate | 0.1 (37) | Ethylene-diamine-triethylenetetra-mine copper acetate | Same as Synthesis No. 2. |
| | Ethylene-diamine | 0.2 (12) | | | | |
| | Triethylene-tetramine | 0.1 (14.6) | | | | |
| 23 | Ethylene-diamine | 0.4 (24) | Mixed metal salt | | Ethylene-diamine copper nickel acetate | Same as Synthesis No. 2. |
| | | | Copper acetate [$Cu(CH_3COO)_2 \cdot H_2O$] | 0.1 (20) | | |
| | | | Nickel acetate | 0.1 (23.7) | | |
| 24 | Ethylene-diamine | 0.2 (12) | Basic copper acetate [$Cu(CH_3COO)_2CuO \cdot 6H_2O$] | 0.075 (27.8) | Ethylene-diamine copper acetate | Same as Synthesis No. 2. |

EXAMPLE 1

The ethylenediamine copper acetate synthesized in above-described Preparation Example 1 (such acetate being hereinafter abbreviated as Cu(EDA)$_2$(AcO)$_2$) was added (at the rates shown in Table 2 below) to the respective mixed solutions prepared by using PAPI-135 (polymethylene-polyphenylene-polyisocyanate, NCO equivalent 135, produced by The Upjohn Co. of the U.S.) as polyisocyanate, Sc-1000 (sucrose-based polyether polyol, OH value 449, produced by Asahi Denka Co., Ltd.) as polyol, N,N′,N″-tris(dimethylamino-propyl)-symhexahydrotriazine (hereinafter referred to as HHT) as catalyst, SH-193 (silicone surfactant produced by Toray Silicone Co., Ltd.) as foam stabilizer and trichloromonofluoromethane (hereinafter referred to as R-11) as foaming agent which were blended at the rates shown in Table 2 below to produce the foams in which the NCO/H* equivalent ratio [-NCO/{—OH+8×Cu(EDA)$_2$ (AcO)$_2$}] was 1. (The NCO/H* equivalent ratio used in the following examples is also the ratio of the total amount of —NCO groups to the total amount of active hydrogen in the reaction mixture). And the relationship between the amount of Cu(EDA)$_2$(AcO)$_2$ and surface flammability and flame resistance was examined. The results are shown in Table 2. In the table, the amount (%) of Cu(EDA)$_2$(AcO)$_2$ was calculated from the following formula:

$$\frac{Cu(EDA)_2(AcO)_2 \times 100}{PAPI\text{-}135 + Sc\text{-}1000 + Cu(EDA)_2(AcO)_2}$$

The amount of the ethylenediamine copper acetate was similarly calculated in the following examples, too. The surface flammability test was conducted according to the Butlar Chimney test method described in Journal of Cellular Plastics, November (1967), Page 497, and the flame penetration time indicating flame resistance was measured according to the Bureau of Mines Flame Penetration Test method described in Journal of Cellular Plastics, March (1968).

In producing the foams, PAPI-135 and R-11 were mixed to form solution A and other components were mixed to form solution B, each solution being previously agitated well, and at the time of foaming, these two solutions A and B were mixed together and agitated rapidly by an electric power drill to effect foaming. In Table 2, Experiment No. 1 is a comparative example where no Cu(EDA)$_2$(AcO)$_2$ was added.

Table 2

| | | Comparative Example | Examples of this invention | | | |
|---|---|---|---|---|---|---|
| Experiment No. | | 1 | 2 | 3 | 4 | 5 |
| Amount (%) of Cu (EDA)$_2$(AcO)$_2$ | | 0 | 1 | 3 | 5 | 8 |
| NCO/H* equivalent ratio | | 1 | 1 | 1 | 1 | 1 |
| Blending ratio | | | | | | |
| Solution (A) | PAPI-135 (g) | 135 | 106.2 | 111.1 | 157.6 | 154 |
| | R-11 (g) | 40 | 31 | 31 | 41 | 38 |
| Solution (B) | Cu(EDA)$_2$(AcO)$_2$(g) | 0 | 2 | 6 | 13.6 | 20 |
| | Sc-1000 (g) | 12.5 | 91.6 | 82.9 | 100.8 | 76 |
| | HHT (g) | 3.2 | 2.6 | 2.5 | 3.5 | 3.4 |
| | SH-193 (g) | 8.2 | 6 | 6.1 | 8.2 | 7.6 |
| Temperature of solution A (°C.) | | 22 | 25 | 25 | 23 | 22 |
| Temperature of solution B (°C.) | | 21 | 22 | 22 | 22 | 20 |
| Foaming properties | Cream time (sec) | 20 | 20 | 15 | 10 | 8 |
| | Rise time (sec) | 80 | 50 | 30 | 30 | 30 |

Table 2-continued

|  | Comparative Example | Examples of this invention | | |
|---|---|---|---|---|
| Experiment No. | 1 | 2 | 3 | 4 | 5 |
| Foam density (g/cm$^3$) | 0.034 | 0.035 | 0.028 | 0.032 | 0.028 |
| Surface flammability test |  |  |  |  |  |
| Weight retention (%) | 16.8 | 38.6 | 52.2 | 59.6 | 62.3 |
| After-flame time (sec) | 18 | 16.6 | 5.5 | 6.0 | 5.3 |
| Flame penetration time (min) | 0.25 | 1.83 | 46 | 38 | 27 |

It is apparent from the results given in Table 2 that addition of Cu(EDA)$_2$(AcO)$_2$ improves surface flammability and flame resistance and an increase of its amount results in further improvements of said properties.

EXAMPLE 2

By using the same materials as used in Example 1, there were produced the foams added with Cu(EDA)$_2$(AcO)$_2$ such that the NCO/H* equivalent ratio would be 1, 2, 3 and 5, respectively (see Table 3), and the foams not added with said substance (see Table 4), and the surface flammability test was conducted on these foams, obtaining the results shown in Tables 3 and 4, respectively.

Table 3

| Experiment No. | | 1 | 2 | 3 | 4 |
|---|---|---|---|---|---|
| NCO/H* equivalent ratio | | 1 | 2 | 3 | 5 |
| Amount of Cu(EDA)$_2$(AcO)$_2$ (%) | | 3 | 3 | 3 | 3 |
| Solution A | PAPI-135 (g) | 111.1 | 146.4 | 163.3 | 180.6 |
| | R-11 (g) | 31 | 30 | 30 | 25 |
| Solution B | Cu(EDA)$_2$(AcO)$_2$ (g) | 6 | 6 | 6 | 6 |
| | Sc-1000 (g) | 82.9 | 47.6 | 36.7 | 13.4 |
| | HHT (g) | 2.5 | 3.3 | 3.6 | 4.0 |
| | SH-193 (g) | 6.1 | 6.1 | 6.1 | 6.1 |
| Temperature of solution A (°C.) | | 25 | 24 | 24 | 24 |
| Temperature of solution B (°C.) | | 22 | 22 | 23 | 21 |
| Foaming properties | Cream time (sec) | 15 | 10 | 10 | 20 |
| | Rise time (sec) | 30 | 25 | 25 | 80 |
| Foam density (g/cm$^3$) | | 0.028 | 0.030 | 0.031 | 0.038 |
| Surface flammability | | | | | |
| After-flame time (sec) | | 5.5 | 6.5 | 5.3 | 1 |
| Weight retention (%) | | 52.5 | 55.9 | 60.2 | 81.6 |

Table 4

| Experiment No. | | 5 | 6 | 7 | 8 |
|---|---|---|---|---|---|
| NCO/H* equivalent ratio | | 1.05 | 2 | 3 | 5 |
| Solution A | PAPI-135 (g) | 141 | 135 | 135 | 135 |
| | R-11 (g) | 40 | 30 | 27 | 25 |
| Solution B | Sc-1000 (g) | 125 | 62 | 42 | 24.8 |
| | HHT (g) | 3.2 | 3 | 3 | 3 |
| | SH-193 (g) | 8.2 | 6 | 5.4 | 4.9 |
| Temperature of solution A (°C.) | | 22 | 25 | 25 | 22 |
| Temperature of solution B (°C.) | | 21 | 20 | 20 | 22 |
| Cream time (sec) | | 20 | 15 | 20 | 20 |
| Rise time (Sec) | | 80 | 80 | 85 | 90 |
| Foam density (g/cm$^3$) | | 0.034 | 0.035 | 0.037 | 0.039 |
| Surface flammability | | | | | |
| After-flame time (sec) | | 18 | 15.8 | 6.6 | 6.0 |

Table 4-continued

| Experiment No. | 5 | 6 | 7 | 8 |
|---|---|---|---|---|
| Weight retention (%) | 16.8 | 35.8 | 57.1 | 72.3 |

The results given in Tables 3 and 4 show that addition of Cu(EDA)$_2$(AcO)$_2$ improves surface flammability for both polyurethane foams and urethane-modified polyisocyanurate foams.

EXAMPLE 3

Foams were produced by using Sp-600 (sorbitol-based polyether polyol, OH value 560, produced by Sanyo Chemical Industries Co., Ltd.) instead of Polyol Sc-1000 and otherwise the same materials as used in Experiment No. 1 (Comparative Example) and Experiment No. 3 (Example of this invention) of Example 1, and surface flammability (weight retention and after-flame time) and flame resistance (flame penetration time) were tested on these foams. The blends used and the results of the flame retardancy test are shown in Table 5.

Table 5

| Experiment No. | | 1 (Comparative Example) | 2 (Example of this invention) |
|---|---|---|---|
| Amount of Cu(EDA)$_2$(AcO)$_2$ (%) | | 0 | 3 |
| NCO/H* equivalent ratio | | 1 | 1 |
| Solution A | PAPI-135 (g) | 113.9 | 119.6 |
| | R-11 (g) | 30 | 25 |
| Solution | Cu(EDA)$_2$(AcO)$_2$ (g) | 0 | 6 |
| B | Sp-600 (g) | 86.2 | 74.4 |
| | HHT (g) | 2.5 | 2.7 |
| | SH-193 (g) | 6.1 | 6.1 |
| Temperature of solution A (°C.) | | 24 | 24 |
| Temperature of solution B (°C.) | | 21 | 25 |
| Foaming properties | Cream time (sec) | 25 | 10 |
| | Rise time (sec) | 110 | 25 |
| Foam density (g/cm$^3$) | | 0.034 | 0.029 |
| Weight retention (%) | | 27.6 | 52.5 |
| After-flame time (sec) | | 19 | 6 |
| Flame penetration time (min) | | 0.5 | 5 |

It is noticed from Table 5 that addition of Cu(EDA)$_2$(AcO)$_2$ markedly improves surface flammability and flame resistance.

EXAMPLE 4

Urethane-modified polyisocyanurate foams were prepared by using the same materials as used in Experiment No. 4 (Example of this invention in Table 3) and Experiment No. 8 (Comparative Example in Table 4) of Example 2 but by replacing Polyol Sc-1000 with Sp-600, and these foams were subjected to the tests of surface flammability (weight retention and after-flame time) and flame resistance (flame penetration time).

The blends used for preparation of foams and the test results are shown in Table 6 below.

Table 6

| Experiment No. | | 1 (Comparative Example) | 2 (Example of this invention) |
|---|---|---|---|
| Amount of $Cu(EDA)_2(AcO)_2$ (%) | | 0 | 3 |
| NCO/H* equivalent ratio | | 5 | 5 |
| Solution A | PAPI-135 (g) | 173.7 | 182.6 |
| | R-11 (g) | 30 | 25 |
| Solution B | $Cu(EDA)_2(AcO)_2$ (g) | 0 | 6 |
| | Sp-600 (g) | 26.3 | 11.6 |
| | HHT (g) | 3.9 | 4.1 |
| | SH-193 (g) | 6.1 | 6.1 |
| Temperature of solution A (°C.) | | 24 | 23 |
| Temperature of solution B (°C.) | | 18 | 21 |
| Foaming properties | Cream time (sec) | 17 | 10 |
| | Rise time (sec) | 80 | 60 |
| Foam density (g/cm$^3$) | | 0.039 | 0.036 |
| Weight retention (%) | | 75.5 | 80.9 |
| After-flame time (sec) | | 1 | 1 |
| Flame penetration time (min) | | 5 | 19 |

It is learned from Table 6 that addition of $Cu(EDA)_2(AcO)_2$ reduces surface flammability and greatly improves flame resistance in the urethane-modified polyisocyanurate foams either.

EXAMPLE 5

A foam was produced by adding $Cu(EDA)_2(AcO)_2$ to the blend of Experiment No. 6 (Table 4) of Example 2 but by replacing PAPI-135 with PAPI-901 (low functional crude MDI, NCO equivalent 133, produced by the Upjohn Co. of the U.S.), and this foam, aftercured for a whole day and night at about 70° C., was subjected to the surface flammability test. There was also produced a foam not added with $Cu(EDA)_2(AcO)_2$ and it was also subjected to the same test. The results are shown in Table 7.

Table 7

| Experiment No. | | 1 (Comparative Example) | 2 (Example of this invention) |
|---|---|---|---|
| Amount of $Cu(EDA)_2(AcO)_2$ (%) | | 0 | 3 |
| NCO/H* equivalent ratio | | 2 | 2 |
| Solution A | PAPI-901 (g) | 133 | 147.9 |
| | R-11 (g) | 30 | 30 |
| Solution B | $Cu(EDA)_2(AcO)_2$ (g) | 0 | 6 |
| | Sc-1000 (g) | 62 | 47.6 |
| | HHT (g) | 3 | 3.3 |
| | SH-193 (g) | 6 | 6.1 |
| Temperature of solution A (°C.) | | 22 | 23 |
| Temperature of solution B (°C.) | | 21 | 20 |
| Foaming properties | Cream time (sec) | 17 | 10 |
| | Rise time (sec) | 85 | 26 |
| Foam density (g/cm$^3$) | | 0.034 | 0.031 |
| Weight retention (%) | | 37.0 | 56 |
| After-flame time (sec) | | 16.0 | 5.3 |
| Flame penetration time (min) | | 30 | 65 |

The results given in Table 7 above indicate that both surface flammability and flame resistance are markely improved according to the method of this invention.

EXAMPLE 6

30 gr of adipic acid was added to 970 gr of PAPI-135 and the mixture was heated at about 80° C. for 3 hours to prepare a prepolymer (NCO equivalent 145), and a foam with the equivalent ratio of 2 was produced by using this prepolymer in lieu of PAPI-135 in Experiment No. 2 (Table 3) of Example 2. The result of the surface fammability test of this foam showed 55% weight retention.

There was similarly produced a foam with the equivalent ratio of 2 without using $Cu(EDA)_2(AcO)_2$. Weight retention of this foam was 36%.

EXAMPLE 7

9 gr of Epikote 819 (an epoxy resin, produced by Mitsubishi Petrochemical Co., Ltd.) was added to 180.6 gr of PAPI-135 and then 25 gr of R-11 was dissolved in this mixture to prepare solution A. Separately from this, 4 gr of $Cu(EDA)_2(AcO)_2$ was dissolved in 9 gr of GP-250 (a glycerin-based polyetherpolyol with OH value 674, produced by Sanyo Chemical Industries Co., Ltd.), and to this solution were further added 4 gr of HHT and 18.3 gr of SH-193 to prepare solution B. Solution A was added to solution B and mixed by an electric power drill to produce a foam. Flame penetration time of this foam was 150 minutes and weight retention as measured in the surface flammability test was 82%. For the sake of comparison, there was produced a foam from the same foaming solutions as said above but by excepting $Cu(EDA)_2(AcO)_2$. Flame penetration time of this foam was 75 minutes and weight retention was 75%.

EXAMPLE 8

Various types of organic amine-metal complexes synthesized in Preparation Examples 2 to 24 were added in amounts shown in Table 8 to the blend of Experiment No. 6 (Table 4) of Example 2 to produce foams. The results are shown in Table 8.

Table 8

| Synthesis No. | Amount (g) | Foam density g/cm$^3$ | Surface flammability | |
|---|---|---|---|---|
| | | | Wt. retention (%) | After-flame time (sec) |
| 2 | 6 | 0.039 | 70 | 6 |
| 3 | 6 | 0.041 | 55 | 8 |
| 4 | 9.4 | 0.041 | 60 | 6 |
| 5 | 7.0 | 0.043 | 44 | 17 |
| 6 | 5.9 | 0.044 | 53 | 7 |
| 7 | 5.9 | 0.038 | 61 | 7 |
| 8 | 8.9 | 0.039 | 57 | 18 |
| 9 | 6.2 | 0.039 | 59 | 7 |
| 10 | 8.2 | 0.038 | 51 | 6 |
| 11 | 9.3 | 0.037 | 51 | 8 |
| 12 | 4.7 | 0.040 | 59 | 7 |
| 13 | 5.5 | 0.042 | 55 | 8 |
| 14 | 4.6 | 0.043 | 55 | 8 |
| 15 | 5.5 | 0.037 | 63 | 6 |
| 16 | 5.1 | 0.043 | 49 | 10 |
| 17 | 9.9 | 0.048 | 69 | 8 |
| 18 | 11.1 | 0.050 | 49 | 12 |
| 19 | 7.5 | 0.038 | 69 | 5 |
| 20 | 5.0 | 0.034 | 54 | 6 |
| 21 | 7.2 | 0.040 | 80 | 4 |
| 22 | 5.3 | 0.038 | 60 | 8 |
| 23 | 6.0 | 0.039 | 61 | 7 |
| 24 | 6.0 | 0.038 | 54 | 6 |

EXAMPLE 9

Foams were produced by adding the complex of copper acetate and ethylenediamine obtained in Preparation Example 1 and, as comparative examples, by adding an inorganic complex [Co(NH$_3$)$_5$Cl]Cl$_2$ insoluble in the raw material solution and a halogen-phosphorus flame retardant trischloroethyl phosphate (CLP) to the blend of Experiment No. 5 (Table 4) of Example 2, and these foams were subjected to the surface flammability and flame penetration tests. The results are shown in Table 9 below.

Table 9

Flame retarding effect of organic amine-metal complex, known flame retarder and inorganic metal complex

|  | None added | Soluble organic amine-metal complex | Halogen phosphorus flame retarder | Halogen phosphorus flame retarder | Insoluble inorganic complex |
| --- | --- | --- | --- | --- | --- |
| Equivalent ratio (NCO/OH) | 1.05 | Same as left | Same as left | Same as left | Same as left |
| PAPI-135 (g) | 141 | Same as left | Same as left | Same as left | Same as left |
| R-11 (g) | 40 | Same as left | Same as left | Same as left | Same as left |
| Sc-1000 (g) | 125 | Same as left | Same as left | Same as left | Same as left |
| HHT (g) | 3.2 | Same as left | Same as left | Same as left | Same as left |
| SH-193 (g) | 8.2 | Same as left | Same as left | Same as left | Same as left |
| Additive (g) |  |  |  |  |  |
| CLP | 0 | 0 | 9.5 | 19 | 0 |
| Cu(AcO)$_2$(EDA)$_2$ | 0 | 9.5 | 0 | 0 | 0 |
| [Co(NH$_3$)$_5$Cl]Cl$_2$ | 0 | 0 | 0 | 0 | 22 |
| Surface flammability |  |  |  |  |  |
| Weight retention (%) | 25 | 63 | 49 | 52 | 40 |
| After-flame time (sec) | 26 | 6 | 8 | 7 | 20 |
| Flame penetration time (sec) | 13 | 598 | 113 | 162 | — |

EXAMPLE 10

6 gr of copper benzoate-ethylenediamine chelate [Cu(EDA)$_2$(C$_6$H$_5$COO)$_2$] was added to the blend of Experiment No. 6 (Table 4) of Example 2 to make a foam, and this foam was subjected to a surface flammability test. The result showed 58% weight retention and 6-second after-flame time, indicating a marked improvement in flame retardancy over the foam not added with said chelate compound (Experiment No. 6 of Example 2).

EXAMPLE 11

6 gr of copper octanoate-ethylenediamine chelate [Cu(EDA)$_2$(C$_7$H$_{15}$COO)$_2$] was added to the blend of Experiment No. 6 (Table 4) of Example 2 to make a foam. The result of the surface flammability test of this foam showed 50% weight retention and 8-second after-flame time, exhibiting a notable improvement in flame retardancy over the foam not added with said chelate compound (foam of Experiment No. 6 of Example 2).

What is claimed is:

1. In a method of producing foams by utilizing the reactivity of isocyanate groups comprising the step of reacting an organic polyisocyanate in the presence of a foaming agent and, optionally, at least one member selected from the group consisting of polyols, polyepoxides, polycarboxylic acids, acid anhydrides and other compounds capable of reacting with the isocyanate groups and, if necessary, a catalyst, a foam stabilizer and other additives, the improvement wherein at least one organic amine-metal complex soluble in the liquid raw material and containing a metal selected from the group consisting of copper, nickel, lead, cobalt, manganese, and chromium is added to the reaction system in an amount of 0.5 to 30 weight % based on the total weight of the raw materials used for preparation of foams.

2. The method according to claim 1, wherein the metal in the organic amine-metal complex is selected from the group consisting of copper, nickel, lead and cobalt.

3. The method according to claim 1, wherein the metal in the organic amine-metal complex is copper.

4. The method according to claim 1, wherein the organic amine is monoalkylmonoamine with 1 to 6 carbon atoms.

5. The method according to claim 1, wherein the organic amine is alkylenepolyamine with 2 to 10 carbon atoms.

6. The method according to claim 1, wherein the organic amine is alkylenediamine with 2 to 6 carbon atoms.

7. The method according to claim 1, wherein the organic amine is aniline.

8. The method according to claim 1, wherein the organic amine-metal complex is a complex of alkylenediamine with 2 to 6 carbon atoms and an organic acid salt of copper.

9. The method according to claim 1, wherein the amount of the organic amine-metal complex in the foam is 1 to 10 weight %.

10. The method according to claim 1, wherein the amount of the organic amine-metal complex in the foam is 2 to 8 weight %.

11. A method of producing flame retardant isocyanate-based foams which comprises reacting polyisocyanate, an organic polyol, a foaming agent, a surfactant and at least one organic amine-metal complexes soluble in the liquid raw material and containing a metal selected from the group consisting of copper, nickel, lead, cobalt, manganese and chromium, wherein the equivalent ratio between the isocyanate groups and the active hydrogen is from 1 to 5 and the organic amine-metal complex is used in an amount of 0.5 to 30 weight % based on the raw material liquid for preparation of foams.

12. The method according to claim 11, wherein the reaction is carried out in the presence of a trimerization catalyst.

13. The method according to claim 11, wherein the organic amine-metal complex is a complex of an organic acid salt of a metal selected from the group consisting of copper, nickel, lead and cobalt and at least one amine selected from the group consisting of monoalkylamine with 1 to 6 carbon atoms, alkylenediamine with 2 to 6 carbon atoms, and aniline.

14. The method according to claim 11, wherein the organic amine-metal complex is selected from the group consisting of ethylenediamine copper acetate, ethylenediamine copper benzoate, aniline copper acetate, monoethanolamine copper acetate and tetramethylethylenediamine copper acetate.

15. The method according to claim 11, wherein the amount of the organic amine-metal complex in the foam is 1 to 10 weight %.

16. Flame-retardant isocyanate-based foams obtained by reacting (1) an organic polyisocyanate, (2) a foaming agent, (3) at least one organic amine-metal complexes soluble in the liquid raw material and containing a metal selected from the group consisting of copper, nickel, lead, cobalt, manganese, and chromium, such complex being used in an amount of 0.5 to 30 weight % based on the total weight of the raw materials, (4) optionally, at least one member selected from the group consisting of polyols, polyepoxides, polycarboxylic acids, acid anhydrides and other compounds capable of reacting whith the isocyanate groups, and (5) if necessary, a catalyst, a foam stabilizer and other additives.

17. The foams according to claim 16, wherein the metal in the organic amine-metal complex is selected from the group consisting of copper, nickel, lead and cobalt.

18. The foams according to claim 16, wherein the metal in the organic amine-metal complex is copper.

19. The foams according to claim 16, wherein the organic amine is monoalkylmonoamine with 1 to 6 carbon atoms.

20. The foams according to claim 16, wherein the organic amine is alkylenepolyamine with 2 to 10 carbon atoms.

21. The foams according to claim 16, wherein the organic amine is alkylenediamine with 2 to 6 carbon atoms.

22. The foams according to claim 16, wherein the organic amine is aniline.

23. The foams according to claim 16, wherein the organic amine-metal complex is a complex of an organic acid salt of copper and at least one amine selected from the group consisting of monoalkylmonoamine with 1 to 6 carbon atoms, alkylenediamine with 2 to 6 carbon atoms and aniline.

24. The foams according to claim 16, wherein the amount of the organic amine-metal complex is 1 to 10 weight %.

25. The foams according to claim 16, wherein the amount of the organic amine-metal complex is 2 to 8 weight %.

26. Flame-retardant polyurethane foams obtained by reacting (1) an organic polyisocyanate, (2) a polyol, (3) a foaming agent, (4) a surfactant, and (5) a complex of an organic acid salt of a metal selected from the group consisting of copper, nickel, lead and cobalt, and at least one amine selected from the group consisting of monoalkylmonoamine with 1 to 6 carbon atoms, alkylenediamine with 2 to 6 carbon atoms and aniline, said complex being soluble in the liquid raw material and used in an amount of 0.5 to 30 weight % based on the total weight of the raw materials used for preparation of foams.

27. Flame-retardant urethane-modified polyisocyanurate foams obtained by reacting (1) an organic polyisocyanate, (2) a polyol, (3) a foaming agent, (4) a surfactant, and (5) a complex of an organic acid salt of a metal selected from the group consisting of copper, nickel, lead and cobalt, and at least one amine selected from the group consisting of monoalkylmonoamine with 1 to 6 carbon atoms, alkylenediamine with 2 to 6 carbon atoms and aniline, said complex being soluble in the raw material liquid, wherein (a) the equivalent ratio between the isocyanate groups and the active hydrogen is greater than 1, (b) said complex is used in an amount of 0.5 to 30 weight % based on the total weight of the raw materials used for preparation of foams, and (c) the reaction is carried out in the presence of a trimerization catalyst.

28. The foams according to claim 27, wherein the organic amine-metal complex is selected from the group consisting of ethylenediamine copper acetate, ethylenediamine copper benzoate, aniline copper acetate, monoethanolamine copper acetate and tetramethylethylenediamine copper acetate.

29. The foams according to claim 27, wherein the amount of the organic amine-metal complex is 1 to 10 weight %.

30. The foams according to claim 27, wherein the amount of the organic amine-metal complex is 2 to 8 weight %.

31. In a method of producing foams by utilizing the reactivity of isocyanate groups consisting of reacting an organic polyisocyanate in the presence of a foaming agent and, optionally, at least one member selected from the group consisting of polyols, polycarboxylic acids, and acid anhydrides and, if necessary, a catalyst, a foam stabilizer and other additives, the improvement wherein at least one organic amine-zinc complex soluble in the liquid raw material is added to the reaction system in an amount 0.5 to 30 weight % based on the total weight of the raw materials used for the preparation of the foams.

32. A method according to claim 31 wherein the organic amine is a monoalkyl monoamine with 1–6 carbon atoms.

33. The method of claim 31 wherein the organic amine is an alkylene-polyamine with 2–10 carbon atoms.

34. The method of claim 31, wherein the organic amine is an alkylene-diamine with 2–6 carbon atoms.

35. The method according to claim 31, wherein the organic amine is aniline.

36. A method according to claim 31, wherein the amount of the organic amine-zinc complex in the foam is 1–10 weight %.

37. The method according to claim 31, wherein the amount of the organic amine-zinc complex in the foam is 2–8 weight %.

38. Flame-retardant isocyanate-based foams obtained by a method which consists of reacting (1) an organic polyisocyanate, (2) a foaming agent, (3) at least one organic amine-zinc complex soluble in the liquid raw material, such complex being used in an amount of 0.5 to 30 wt % based on the total weight of the raw materials, (4) optionally, at least one member selected from the group consisting of polyols, polycarboxylic acids, and acid anhydrides, and (5) if necessary, a catalyst, a foam stabilizer and other additives.

39. The foams of 38, wherein the organic amine is a monoakly monoamine with 1-6 carbon atoms.

40. The foams according to claim 38, wherein the organic amine is an alkylenepolyamine with 2-10 carbon atoms.

41. The foams according to claim 38, wherein the organic amine is an alkylenediamine with 2-6 carbon atoms.

42. The foams according to claim 38, wherein the organic amine is aniline.

43. The foam according to claim 38, wherein the amount of the organic amine-zinc complex is 1-10 weight %.

44. The foam according to claim 38, wherein the amount of organic amine-zinc complex is 2-8 weight %.

45. A method of retarding the flammability of isocyanate-based foams which comprises including in the raw materials used for said isocyanate-based foams 0.5-30% weight based on the total weight of said raw materials used for preparation of the foam, of an organic amine-metal complex, soluble in the liquid raw material and containing a metal selected from the group consisting of copper, nickel, lead, cobalt, manganese, zinc and chromium; and wherein said foam is prepared from an organic polyisocyanate and optionally at least one member selected from the group consisting of polyols, polyepoxides, polycarboxylic acids, acid anhydrides and other compounds capable of reacting with isocyanate groups.

46. The method of claim 45 wherein said metal is selected from the group consisting of copper, nickel, lead and cobalt.

47. The method of claim 46 wherein said metal is copper.

48. The method of claim 45 wherein said organic amine is a monoalkylamine with 1 to 6 carbon atoms.

49. The method of claim 45 wherein said organic amine is aniline.

50. The method of claim 45 wherein said organic amine is an alkylene polyamine of 2-10 carbon atoms.

* * * * *